United States Patent
Lim et al.

(10) Patent No.: US 8,575,552 B2
(45) Date of Patent: Nov. 5, 2013

(54) SYSTEM AND METHOD FOR DISTINGUISHING AND DETECTING MULTIPLE INFRARED SIGNAL COORDINATES

(75) Inventors: Jeongmook Lim, Daejeon (KR); Yongki Son, Daejeon (KR); Dongwoo Lee, Daejeon (KR); Ilyeon Cho, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 1016 days.

(21) Appl. No.: 12/624,581

(22) Filed: Nov. 24, 2009

(65) Prior Publication Data
US 2010/0155604 A1 Jun. 24, 2010

(30) Foreign Application Priority Data
Dec. 22, 2008 (KR) .................. 10-2008-0131557

(51) Int. Cl.
*G01P 13/00* (2006.01)
(52) U.S. Cl.
USPC ......... 250/342; 250/340; 250/338.1; 345/158
(58) Field of Classification Search
USPC .................. 250/342, 340, 338.1; 345/158
See application file for complete search history.

(56) References Cited

U.S. PATENT DOCUMENTS

| 3,598,344 | A | * | 8/1971 | Walters et al. | 244/3.11 |
|---|---|---|---|---|---|
| 4,924,216 | A | * | 5/1990 | Leung | 463/38 |
| 5,098,110 | A | * | 3/1992 | Yang | 463/39 |
| 6,326,620 | B1 | * | 12/2001 | Willis | 250/338.1 |
| 7,629,967 | B2 | * | 12/2009 | Newton | 345/173 |
| 8,227,742 | B2 | * | 7/2012 | Drumm | 250/221 |
| 2003/0090566 | A1 | * | 5/2003 | Smith et al. | 348/131 |
| 2009/0278794 | A1 | * | 11/2009 | McReynolds et al. | 345/156 |
| 2010/0045819 | A1 | * | 2/2010 | Pillman et al. | 348/226.1 |

FOREIGN PATENT DOCUMENTS

| KR | 1998-041328 A | 8/1998 |
|---|---|---|
| KR | 1020050074802 A | 7/2005 |
| KR | 1020080043634 A | 5/2008 |
| KR | 1020080067089 A | 7/2008 |
| KR | 1020080079773 A | 9/2008 |

* cited by examiner

*Primary Examiner* — David Porta
*Assistant Examiner* — Djura Malevic
(74) *Attorney, Agent, or Firm* — Ladas & Parry LLP

(57) ABSTRACT

Disclosed are a method and system for tracking multiple infrared signal coordinates. The method for tracking multiple infrared signal coordinates includes: sequentially operating a plurality of infrared generators; photographing the infrared generators; calculating frequency photographed by each infrared generators; and when the calculated frequency at the time of calculating does not meet the reference value, delaying, by a delay time, the flickering of the infrared generator where the frequency does not meet the reference value.

16 Claims, 8 Drawing Sheets

T:TIME WHILE INFRARED RAYS ARE TURNED-ON

2T:TIME WHILE INFRARED RAYS ARE TURNED-OFF

TIMING PHOTOGRAPHED BY CAMERA

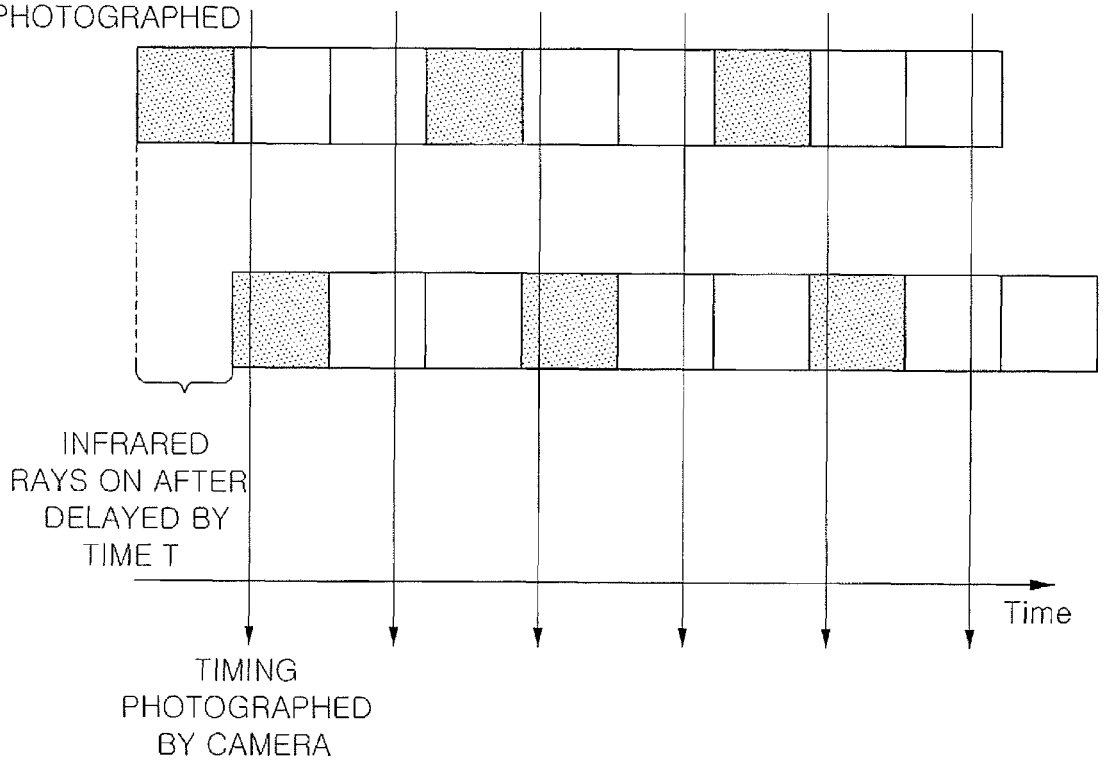

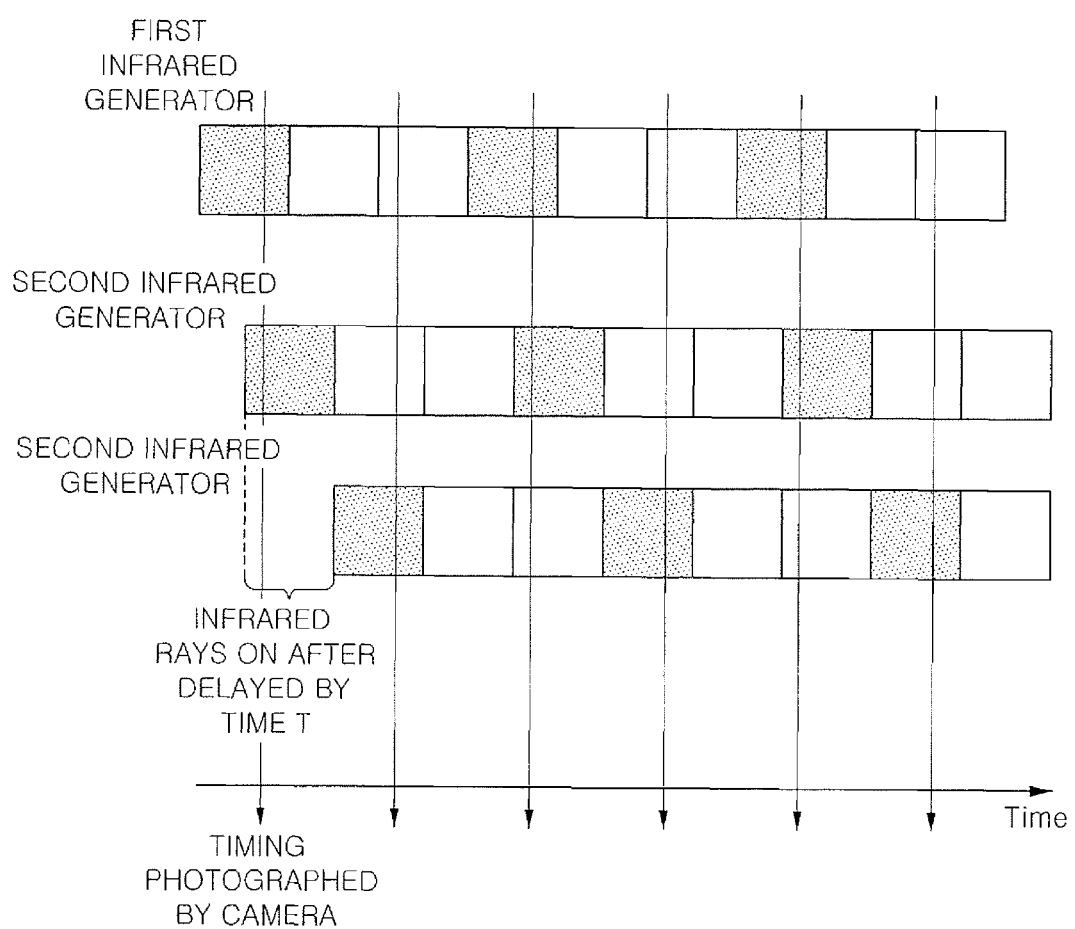

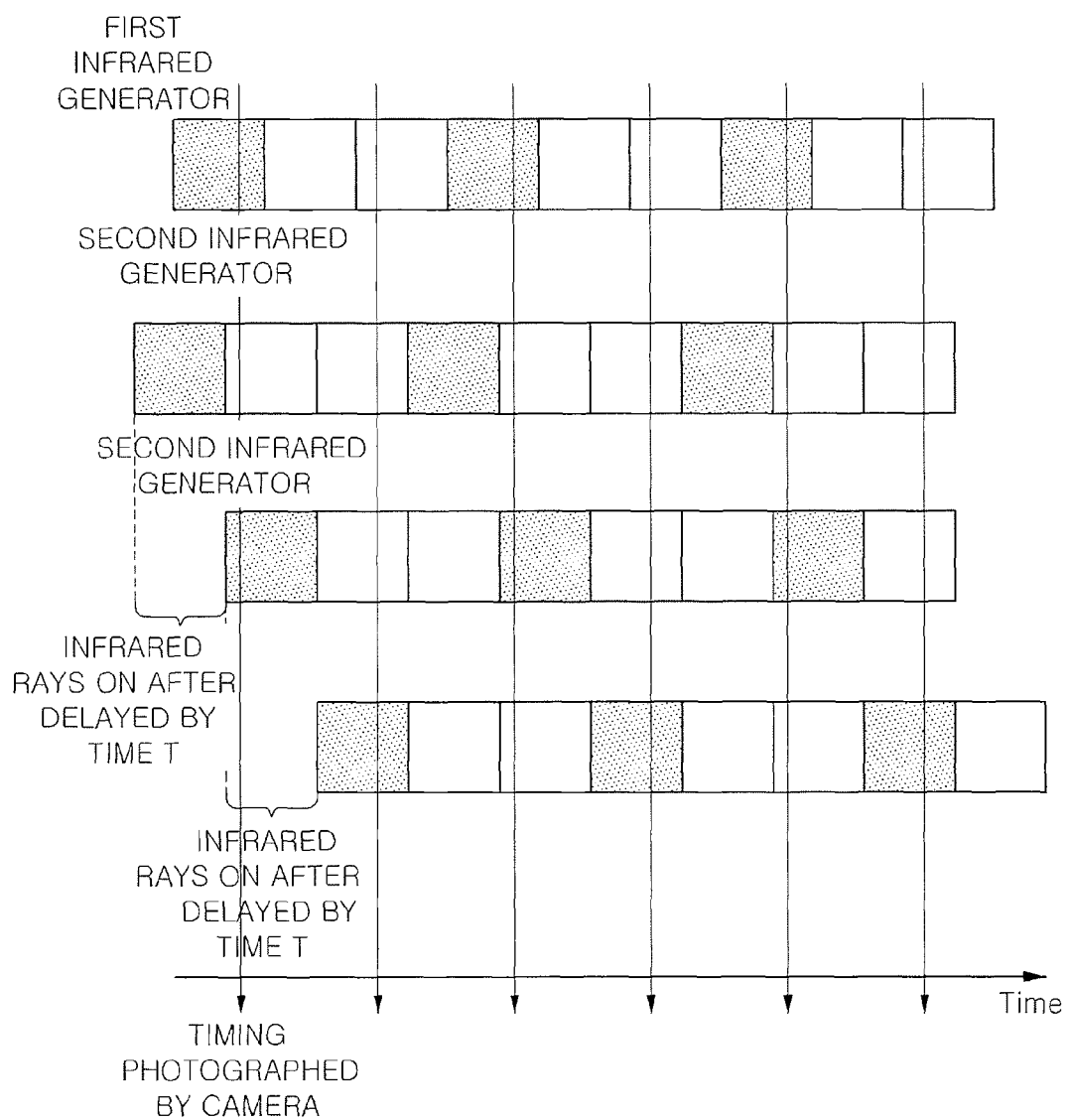

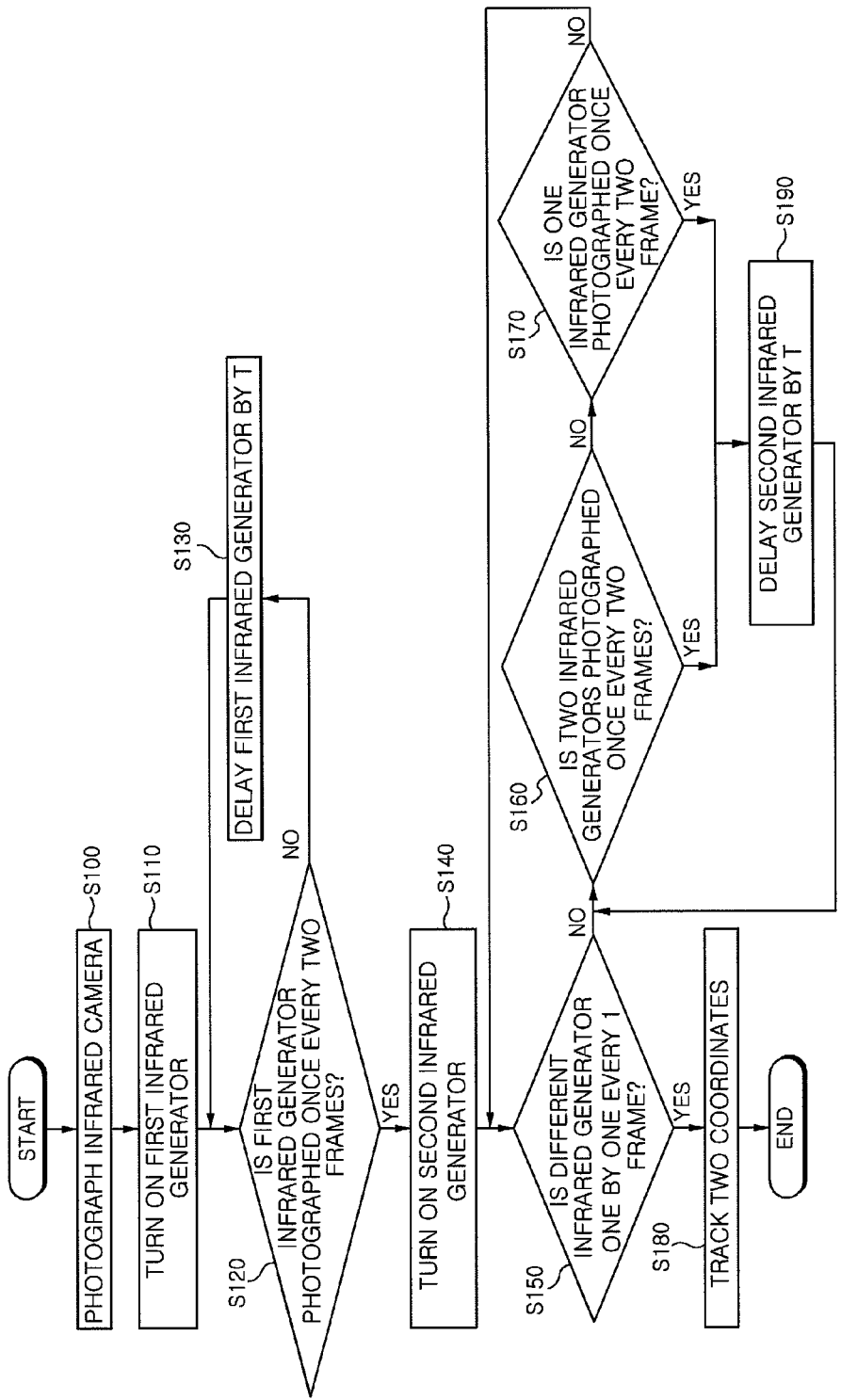

SYSTEM AND METHOD FOR DISTINGUISHING AND DETECTING MULTIPLE INFRARED SIGNAL COORDINATES

RELATED APPLICATIONS

The present application claims priority to Korean Patent Application Serial Number 10-2008-0131557, filed on Dec. 22, 2008, the entirety of which is hereby incorporated by reference.

BACKGROUND OF THE INVENTION

1. Field of the Invention

The present invention relates to a user interface device using infrared rays, and more specifically, to a method for distinguishing and detecting movements of multiple infrared generating devices and managing IDs of the infrared generating devices, when tracking positions of the infrared generating devices using infrared cameras.

2. Description of the Related Art

A method for tracking points using infrared cameras, which uses a principle of brightly displaying only infrared generator portions when photographing the infrared generator by using a camera on which an infrared pass filter (or visible ray cut off filter) is mounted, is a technology that is generally used for a game machine interface of wiiremote available from Nintendo Co., etc., a computer mouse, and the like. Since the image photographed by the infrared camera is an image whose visible rays are filtered, a gray image for the infrared generator can be obtained and the gray image can be converted into a black and white image by a simple image processing technology. Therefore, when masking a snapshot for the black and white image, the positional information of the infrared generator can be easily obtained by two-dimensional coordinates. Further, high-speed photographing can be achieved due to the improved performance of the camera, the coordinate tracking can be smoothly performed.

The method can better track the two-dimensional coordinates by a simple method without performing image processing or needing a separate additional device, such that it can be used for a game machine interface of wiiremote available from Nintendo Co., etc., a computer mouse, and the like.

Currently, due to the appearance of a multi touch or a user interface such as a whiteboard used by users, a technology of processing a single point as well as multi points in a graphical user interface area is necessary. In particular, there is a need to distinguish different users in the case of the whiteboard. In the case of a whiteboard system shared by multiple users, when the user job workroom is photographed by the infrared camera and each user uses the infrared generating device as the input device, such that the users can write letters or draw pictures or operate application programs. Although the method can easily track the multi point coordinates, it is difficult to distinguish the difference between letters, pictures, or application programs of each user. The reason is that the image of the infrared camera does not have user information (user ID). In addition, a similar problem occurs even when the infrared generator uses the input device of the multi-touch application. When the infrared generator is held by both hands of the user and the user workroom is photographed by the infrared camera, and the motions of both hands of the user are tracked and objects such as pictures can be selected, such that it can provide more convenient user interface than a case of using the existing mouse in terms of lengthening, reducing, turning, etc. Although, even in this case, if both hands can be distinguished, it is advantageous in that more gesture instructions can be recognized.

SUMMARY OF THE INVENTION

It is an object of the present invention to solve the foregoing problems of the related art, that is, a problem of tracking coordinates but cannot distinguish different infrared generators when tracking multiple coordinates using an infrared camera and one or more infrared generator.

According to one aspect of the present invention, there is provided a method for tracking multiple infrared signal coordinates including: sequentially operating multiple infrared generators; photographing the infrared generators; calculating the frequency photographed by each infrared generators; and when the calculated frequency at the time of calculating does not meet the reference value, delaying the flickering of the infrared generator where the frequency does not meet the reference value by a delay time.

The method for tracking multiple infrared signal coordinates may further include starting coordinate tracking of the infrared generator when the calculated frequency meets the reference value.

Herein, the reference value may be 'once per k frame' when the number of infrared generators is k.

In the method for tracking multiple infrared signal coordinates, the multiple infrared generators include a first infrared generator and a second infrared generator and operate the first generator earlier than the second infrared generator, such that it can be configured to operate the second infrared generator only when the calculated frequency meets the reference value.

In addition, the method for tracking multiple infrared signal coordinates can be operated to start the signal coordinate tracking of the first and second infrared generators only when the frequency photographed for the second infrared generator meets the reference value and the first infrared generator and the second infrared generator are photographed at different frames.

The method for tracking multiple infrared signal coordinates can be operated to delay the second infrared generator by a delay time when the frequency photographed for the second infrared generator meets the reference value and the first infrared generator and the second infrared generator are photographed at the same frame or the second infrared generator is not photographed.

Herein, the photographing speed photographed by the infrared generator can be set to n frames per second when the infrared generator is two and the delay time can be set to $1/3 \times n$.

According to another aspect of the present invention, there is provided a system for tracking infrared signal coordinates including multiple infrared generators and infrared camera devices, wherein the infrared generators can be configured to include: an infrared light emitting unit; a wireless communication unit that receives flickering control signal from the infrared camera device; and a flickering controller that receives the flickering control signals from the wireless communication unit to control the flickering of the infrared generators, wherein the infrared camera device can be configured to include: an infrared filter that extracts infrared rays from the infrared generators; a camera unit that photographs the infrared generators and generates the flickering control signals for the infrared generator; a coordinate calculator that calculates infrared signal coordinates according to the photographing results; and a wireless communication unit that transmits the generated flickering control signals to the infrared generators.

The flickering controller can be operated to delay the infrared generator by a delay time.

The camera unit can be operated to calculate frequency photographed by the infrared generators.

Further, the camera unit can be operated to generate the flickering control signals in order to delay the infrared generators by a delay time when the calculated frequency does not meet the reference value.

According to yet another aspect of the present invention, there is provided infrared generators used for a system for tracking multiple infrared signal coordinates including: an infrared light emitting unit; a wireless communication unit that receives flickering control signals from the infrared camera devices; and a flickering controller that receives the flickering control signals from the wireless communication unit to control the flickering of the infrared generators.

The flickering controller can be operated to delay the infrared generator by a delay time.

According to still another aspect of the present invention, there is provided an infrared camera device used for a system for tracking multiple infrared signal coordinates including: an infrared filter that extracts infrared rays from infrared generators; a camera unit that photographs the infrared generators and generates the flickering control signals for the infrared generator; a coordinate calculator that calculates infrared signal coordinates according to the photographing results; and a wireless communication unit that transmits the generated flickering control signals to the infrared generators.

The camera unit can be operated to calculate the frequency photographed by the infrared generators.

Further, the camera unit can be operated to generate the flickering control signals in order to delay the infrared generators by a delay time when the calculated frequency does not meet the reference value.

The present invention performs the coordinate tracking by distinguishing each infrared generator by the wireless communication unit and simple algorithm when tracking the multiple coordinates using the infrared camera and one or more infrared generator, making it possible to distinguish the users on the white board that is commonly used by multiple users. Further, even when the infrared generators held by both hands are used as the individual input device such as the multi touch, etc., the present invention can distinguish both hands, such that the infrared generators can be used for various input devices that can generate more gesture commands, etc.

BRIEF DESCRIPTION OF THE DRAWINGS

FIG. 3 shows when the infrared generator is delayed by a delay time (T) in the case of FIG. 2B;

FIG. 5 shows a case where two infrared generators are photographed at the same frame for the multiple infrared generators when turning-on the second infrared generator;

FIGS. 6A-6B show a case where one infrared generator is photographed for every two frames when turning-on the second infrared generator; and FIG. 7 shows an algorithm for distinguishing and tracking multiple infrared signal coordinates according to one embodiment of the present invention.

DETAILED DESCRIPTION OF THE PREFERRED EMBODIMENTS

Hereinafter, preferred embodiments of the present invention will be described in detail with reference to the accompanying drawings.

Figure 1:
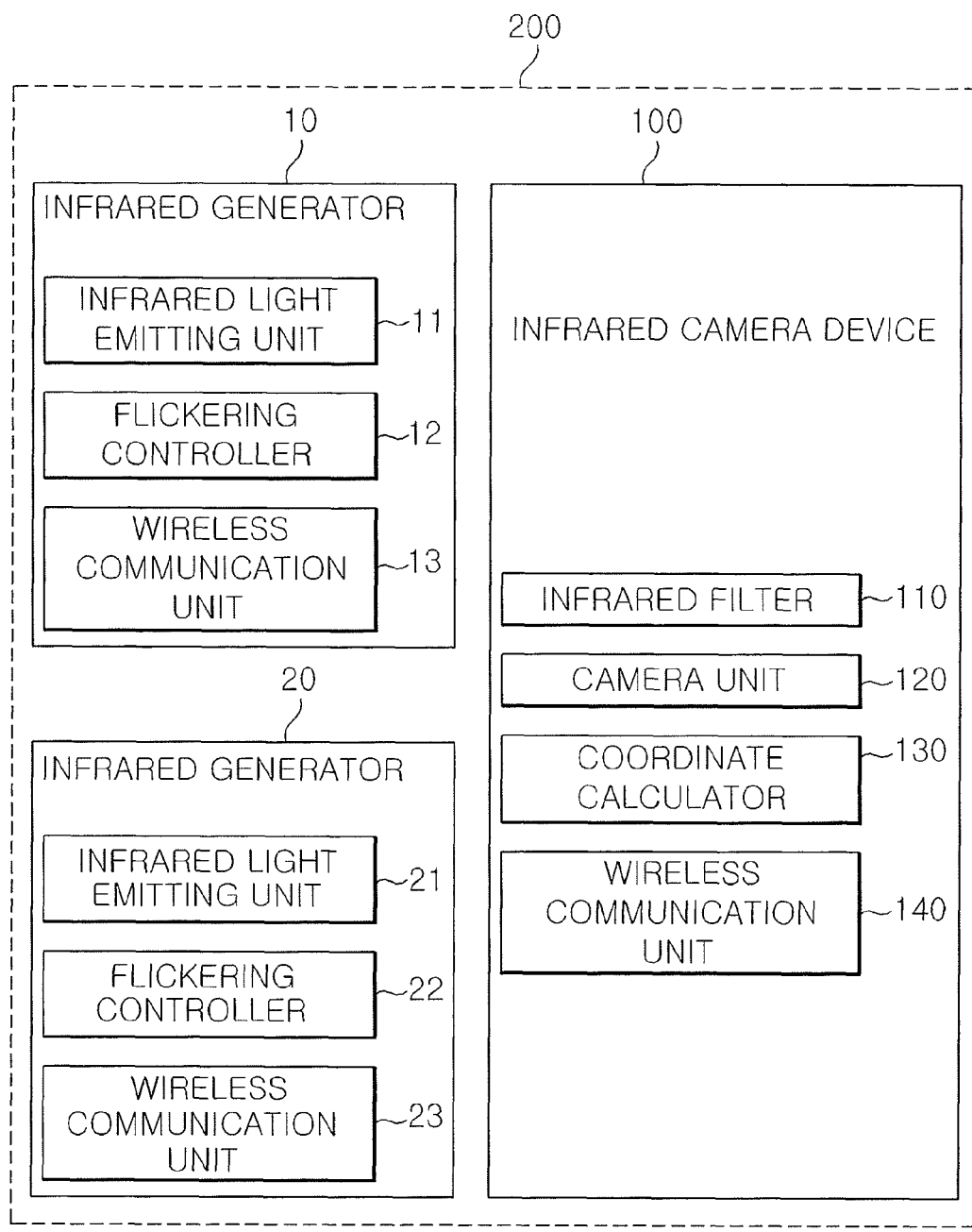
FIG. 1 shows a system for tracking infrared signal coordinates according to the present invention.

FIG. 1 shows a system 200 for tracking infrared signal coordinates according to one embodiment of the present invention. The system 200 for infrared signal coordinates according to the present invention distinguishes multiple infrared generators using an infrared camera 100 and one or more infrared generator 10.

The infrared generator 10 of the system 200 includes an infrared light emitting unit 11, a flickering controller 12, and a wireless communication unit 13. The wireless communication unit 13 in the infrared generator can communicate wirelessly with the infrared camera device 100. The infrared light emitting unit 11 is flickered by repeating the process of turning-on for t seconds and turning-off for 2*t seconds. At this time, the range of t can be controlled to be equal to ⅓*n when the camera photographing speed is n frame. When the flickering controller 12 receives signals from the infrared camera through the wireless communication unit, it operates to control the signal flickering of the infrared generator 10. In other words, the flickering controller 12 can receive signals from the infrared camera through the wireless communication unit to delay flickering of the infrared generator 10 by t time and operate to flicker the infrared generator 10.

The infrared camera device 100 of the system 200 includes the infrared filter 110, the camera unit 120, the coordinate calculator 130, and the wireless communication unit 140. The infrared filter 110 is operated as a visible ray cut off filter and an infrared pass filter that cuts off visible rays and passes infrared rays. The infrared camera unit 120 is operated to fast photograph 200 frames or more per second by the infrared camera device 100.

The coordinate calculator 130 calculates two infrared generator coordinates by analyzing the photographing results. The wireless communication unit 140 is a device that is configured to communicate with a host computer or an infrared generator 10 that can communicate with the infrared camera device 100.

A method for distinguish two infrared generators according to one embodiment of the present invention will be described with reference to FIG. 2. The workroom is photographed by the infrared camera and each infrared generator is sequentially turned-on. When the first infrared generator 10 is turned-on, two cases are generated.

Figure 2A:
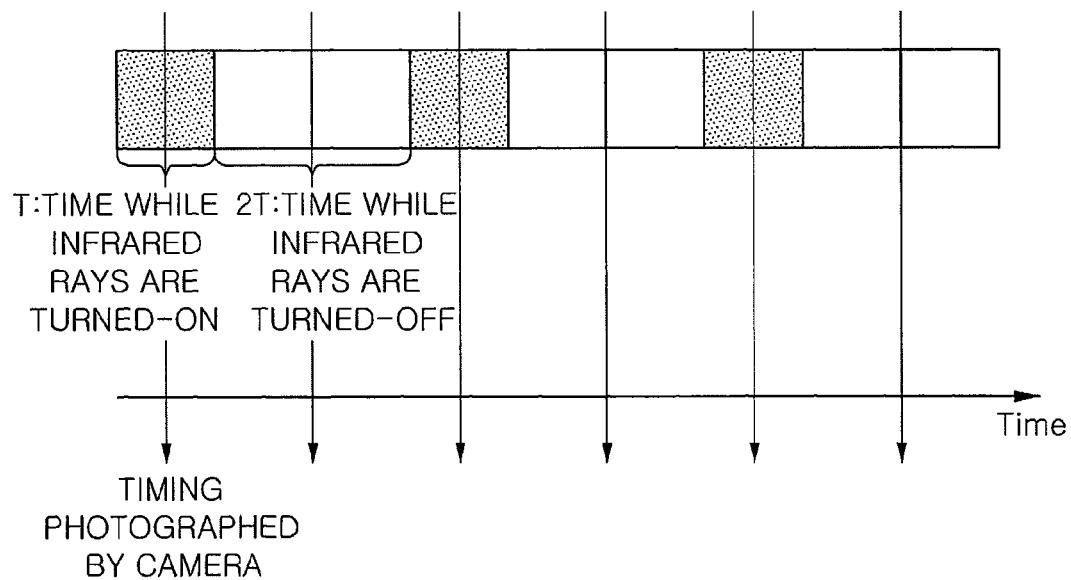
FIG. 2A shows a case of a normal infrared image when turning-on a first infrared generator according to one embodiment of the present invention.
Figure 2B:
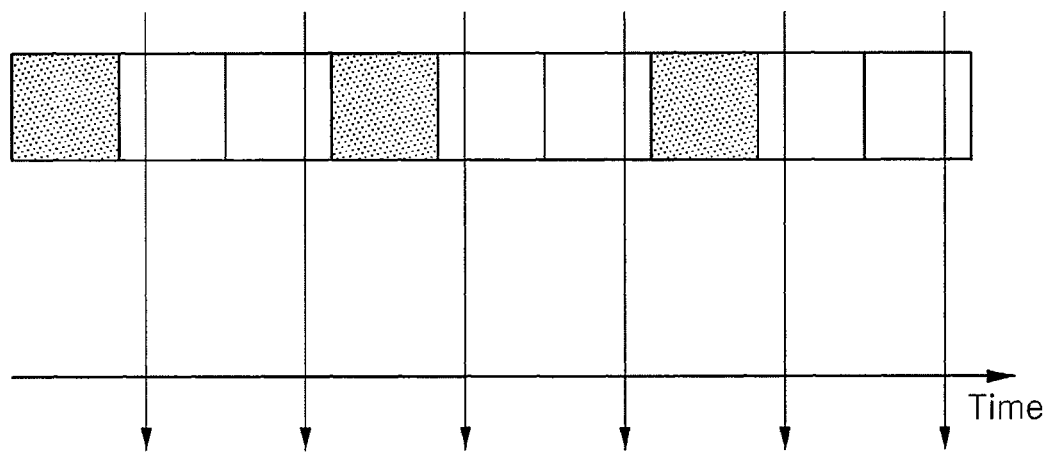
FIG. 2B shows a case where infrared image is not photographed when turning-on the first infrared generator according to one embodiment of the present invention.

The first case is shown in FIG. 2A and the second case is shown in FIG. 2B. FIG. 2A shows a case where the infrared generator is photographed once every two frames and FIG. 2B shows a case where the infrared generator is not photographed per frame. Since FIG. 2A corresponds to a normal case, a separate process is not performed. FIG. 2B needs to control the flickering so that the infrared generator can be photographed per one frame.

FIG. 3 shows a case where infrared rays are controlled to be flickered by delaying them by t time of FIG. 2B. In other words, when the infrared generator is not photographed per one frame, the infrared camera device 100 transmits signals to the infrared generator 10 through the wireless communication unit 140 and flickers infrared rays by delaying them by t time. Thereby, the infrared generator can be photographed once every two frames.

When the first infrared generator 10 is photographed once every two frames, the second infrared generator 20 is turned-on to perform the photographing. At this time, three cases may occur.

Hereinafter, each case will be described with reference to FIGS. 4 to 6.

Figure 4:
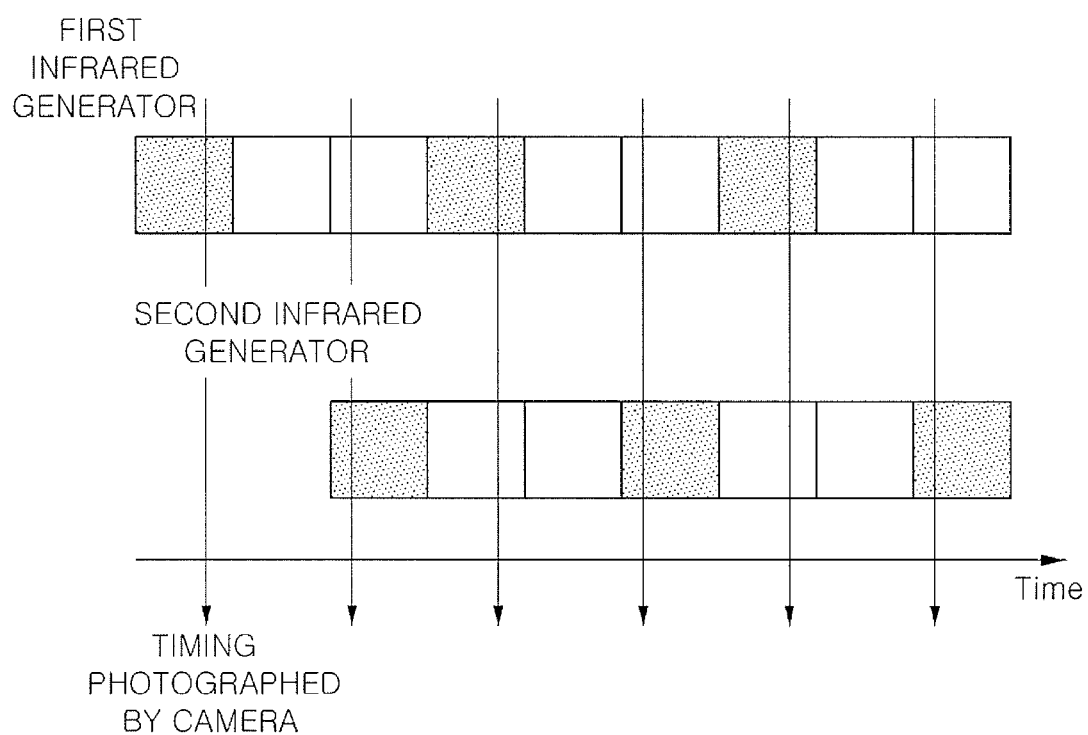
FIG. 4 shows a case of photographing a normal infrared image for the infrared generator when turning-on a second infrared generator.
Figure 6A:
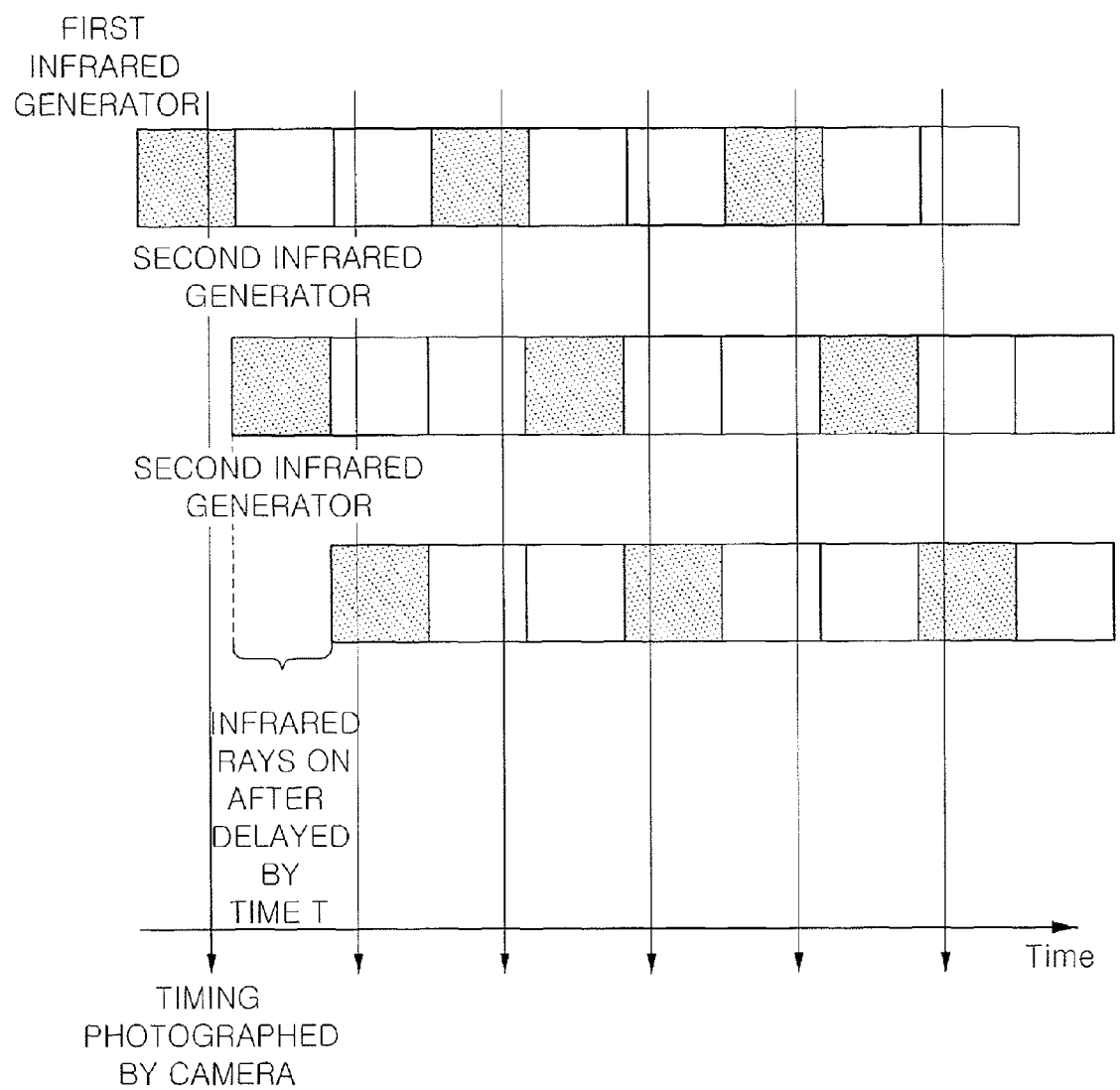

FIG. 4 shows a case where one infrared generator is photographed per each frame, FIG. 5 shows a case where two infrared generators 10 and 20 are photographed once every two frames and FIGS. 6A-6B show a case where one infrared generator is photographed every two frames.

FIG. 4 shows a normal case, wherein different infrared generators can perform the photographing per one frame, such that two infrared generator can be distinguished and tracked.

FIG. 5 shows a case where two infrared generators are photographed per one frame, the signals are transmitted to the second infrared generator 20 that is turned-on and delays it by t time so that the infrared generator 20 generates infrared rays. Thereby, since different infrared generators are photographed per one frame, the two infrared generators can be distinguished and the position thereof can be tracked.

FIGS. 6A-6B show a case where one infrared generator is photographed every two frames, wherein the case is divided into two cases. FIG. 6A shows the first case. The signal is transmitted to the second infrared generator 20, which delays and generates infrared rays by t time. Thereby, since different infrared generators are photographed per one frame, the two infrared generators can be distinguished and the position thereof can be tracked. FIG. 6B shows the second case. The signal is transmitted to the second infrared generator 20, which delays and generates infrared rays by t time. Thereby, since the case is the same as the case shown in FIG. 5, it is processed in the same way shown in FIG. 5.

In other words, when the second infrared generator 20 that is newly turned-on is delayed by 2*t as much as possible, each infrared generator can be distinguished and photographed every frame in all cases, such that the infrared generator can be distinguished and tracked.

FIG. 7 is a flowchart of the foregoing algorithm.

First, in order to track the signal tracking from the infrared generator, photographing by the infrared camera starts (S100). The multiple infrared generators are sequentially turned-on. Among those, the first infrared generator is turned-on (S110). It determines that the first infrared generator is photographed once every two frames (S120). If the first infrared generator is not observed once every two frames, the first infrared generator is delayed by T (S130). Finally, when the first infrared generator is photographed once every two frames, the second infrared generator is turned-on (S140). It determines that different infrared generator is photographed one by one every one frame by continuously photographing by the infrared camera in the state where the second infrared generator is turned-on (S150). As the observation results, when different infrared generators are photographed one by one per 1 frame, two coordinates can be distinguished, such that tracking of two coordinates are being performed (S180). However, as the observation result, if it is observed that different infrared generators is not photographed one by one every one frame and two infrared generators are photographed once every two frames (S160), the operation of delaying the second infrared generator by T is performed (S190). If the photographing is performed once every two frames but the infrared generator that performs the photographing is one (S170), the operation of delaying the second infrared generator by T time is performed (S190) even in this case.

As described above, the operation 190 of delaying the infrared generator by T time can be performed by the flickering controller of the infrared generator by the signals transmitted to the wireless communication unit from the infrared camera device. The second infrared generator and the first infrared generator that are flickered by being delayed by t time are continuously observed and the photographing (S160 and S170) and the delaying of the second infrared generator by T time (S190) from the state where different infrared generators are photographed one by one every one frame so that it is repeated until two signal coordinates are distinguished and tracked.

Accordingly, although the preferred embodiments disclosed in the present invention are shown and described, the present invention is not limited to the foregoing specific embodiments. Many changes and modifications within the scope of the present invention may be made by those skilled in the art without departing from the spirit thereof and the invention includes all such modifications.

What is claimed is:

1. A method for tracking multiple infrared signal coordinates, comprising:
   sequentially operating multiple infrared generators;
   photographing the infrared generators;
   calculating the frequency photographed by each infrared generators; and
   when the calculated frequency at the time of calculating does not meet the reference value, delaying the flickering of the infrared generator where the frequency does not meet the reference value by a delay time.

2. The method for tracking multiple infrared signal coordinates according to claim 1, further comprising starting the coordinate tracking of the infrared generator when the calculated frequency meets the reference value.

3. The method for tracking multiple infrared signal coordinates according to claim 1, wherein the reference value may be 'once per k frame' when the number of infrared generators is k.

4. The method for tracking multiple infrared signal coordinates according to claim 1, wherein the multiple infrared generators include a first infrared generator and a second infrared generator and the method operates the first generator earlier than the second infrared generator, such that the second infrared generator is operated only when the calculated frequency meets the reference value.

5. The method for tracking multiple infrared signal coordinates according to claim 4, wherein the method start the signal coordinate tracking of the first and second infrared generators only when the frequency photographed for the second infrared generator meets the reference value and the first infrared generator and the second infrared generator are photographed at different frames.

6. The method for tracking multiple infrared signal coordinates according to claim 4, wherein the method delays the second infrared generator by a delay time when the frequency photographed for the second infrared generator meets the reference value and the first infrared generator and the second infrared generator are photographed at the same frame or the second infrared generator is not photographed.

7. The method for tracking multiple infrared signal coordinates according to claim 1, wherein the photographing speed photographed by infrared generator is set to n frames per second when the infrared generator is two and the delay time can be set to $1/3 \times n$.

8. A system for tracking infrared signal coordinates including multiple infrared generators and infrared camera devices, the infrared generators including:
   an infrared light emitting unit;
   a wireless communication unit that receives flickering control signal from the infrared camera device; and
   a flickering controller that receives the flickering control signals from the wireless communication unit to control the flickering of the infrared generators, and
   the infrared camera device including:
   an infrared filter that extracts infrared rays from the infrared generators;
   a camera unit that photographs the infrared generators and generates the flickering control signals for the infrared generator;
   a coordinate calculator that calculates infrared signal coordinates according to the photographing results; and
   a wireless communication unit that transmits the generated flickering control signals to the infrared generators.

9. The system for tracking infrared signal coordinates according to claim 8, wherein the flickering controller is operated to delay the infrared generator by a delay time.

10. The apparatus of claim 9, wherein the flickering controller controls the flickering of the infrared generators such that the camera unit photographs only one flicker amongst a sequential plurality of flickers generated by the infrared generators.

11. The system for tracking infrared signal coordinates according to claim 8, wherein the camera unit is operated to calculate the frequency photographed by the infrared generators.

12. The system for tracking infrared signal coordinates according to claim 11, wherein the camera unit is operated to generate the flickering control signals in order to delay the infrared generators by a delay time when the calculated frequency does not meet the reference value.

13. Infrared generators used for a system for tracking multiple infrared signal coordinate, comprising:
   an infrared light emitting unit;
   a wireless communication unit that receives flickering control signals from the infrared camera devices; and
   a flickering controller that receives the flickering control signals from the wireless communication unit to control the flickering of the infrared generators.

14. The infrared generators according to claim 13, wherein the flickering controller can be operated to delay the infrared generator by a delay time.

15. An infrared camera device used for a system for tracking multiple infrared signal coordinates, comprising:
   an infrared filter that extracts infrared rays from infrared generators;
   a camera unit that photographs the infrared generators and generates the flickering control signals for the infrared generator;
   a coordinate calculator that calculates infrared signal coordinates according to the photographing results; and
   a wireless communication unit that transmits the generated flickering control signals to the infrared generators, wherein the camera unit is operated to generate the flickering control signals in order to delay the infrared generators by a delay time when the calculated frequency does not meet the reference value.

16. The infrared camera device according to claim 15, wherein the camera unit is operated to calculate the frequency photographed by the infrared generators.

* * * * *